U S 006048507A

United States Patent [19]
Amouzegar et al.

[11] Patent Number: 6,048,507
[45] Date of Patent: Apr. 11, 2000

[54] PROCESS FOR THE PURIFICATION OF LITHIUM CARBONATE

[75] Inventors: Kamyab Amouzegar; Guy St. Amant; Stephen Harrison, all of Shawinigan, Canada

[73] Assignee: Limtech, Cap Rouge, Canada

[21] Appl. No.: 09/143,330

[22] Filed: Aug. 28, 1998

Related U.S. Application Data

[60] Provisional application No. 60/069,165, Dec. 9, 1997.

[51] Int. Cl.$^7$ .............................. C01D 15/00; C01D 7/00
[52] U.S. Cl. ........................................ 423/179.5; 423/421
[58] Field of Search ................................ 423/179.5, 181, 423/421, 157, 139; 210/685, 687, 683, 681, 688

[56] References Cited

U.S. PATENT DOCUMENTS

| | | | |
|---|---|---|---|
| 2,243,392 | 5/1941 | Page | 66/107 |
| 2,390,095 | 12/1945 | Gloss | 23/67 |
| 2,630,374 | 3/1953 | Miller | 23/225 |
| 3,112,170 | 11/1963 | Archambault et al. | 23/33 |
| 3,112,171 | 11/1963 | Archambault | 23/63 |
| 3,344,046 | 9/1967 | Neikam | 204/59 |
| 3,857,920 | 12/1974 | Grantham et al. | 423/179.5 |
| 4,036,713 | 7/1977 | Brown | 204/96 |
| 4,124,684 | 11/1978 | Olivier, et al. | 423/179.5 |
| 4,207,297 | 6/1980 | Brown et al. | 423/179.5 |
| 4,243,392 | 1/1981 | Brown et al. | 23/295 S |
| 4,261,960 | 4/1981 | Boryta | 423/179.5 |
| 4,271,131 | 6/1981 | Brown et al. | 423/179.5 |
| 4,274,834 | 6/1981 | Brown et al. | 23/302 R |
| 4,405,574 | 9/1983 | Lee et al. | 423/157 |
| 4,617,099 | 10/1986 | Verdier et al. | 204/68 |
| 4,723,962 | 2/1988 | Mehta | 23/302 R |
| 4,734,055 | 3/1988 | Musu | 439/356 |
| 4,842,254 | 6/1989 | Roumieu | 266/88 |
| 4,855,059 | 8/1989 | Frianeza-kullberg et al. | 423/181 |
| 4,859,343 | 8/1989 | Frianeza-kullberg et al. | 423/179.5 |
| 4,980,136 | 12/1990 | Brown et al. | 423/179.5 |
| 4,988,417 | 1/1991 | DeYoung | 204/68 |
| 5,104,500 | 4/1992 | Ruthel | 204/94 |
| 5,118,716 | 6/1992 | Arsenault | 521/33 |
| 5,219,950 | 6/1993 | Brown et al. | 423/419 R |
| 5,451,383 | 9/1995 | Leavitt | 423/179.5 |

FOREIGN PATENT DOCUMENTS

| | | |
|---|---|---|
| 1221499 | 5/1987 | Canada . |
| 61-251511 | 11/1986 | Japan . |
| 62-161973 | 7/1987 | Japan . |
| 62-252315 | 11/1987 | Japan . |
| 1-152226 | 6/1989 | Japan . |
| 2190668 | 11/1987 | United Kingdom . |

OTHER PUBLICATIONS

Duolite Brochure, 12 pages.
Purolite Brochure, 22 pages.

*Primary Examiner*—Steven Bos
*Attorney, Agent, or Firm*—Pillsbury Madison & Sutro LLP; W. Patrick Bengtsson

[57] ABSTRACT

Disclosed are methods for preparing high purity lithium carbonate which can be used for pharmaceutical applications, electronic grade crystals of lithium or to prepare battery-grade lithium metal. Lithium carbonate as commercially produced from mineral extraction, lithium-containing brines or sea water, in aqueous solution is used as a feedstock and reacted with carbon dioxide under pressure to form dissolved lithium bicarbonate. Impurities in the lithium carbonate feedstock are either solubilized or precipitated out. Dissolved impurities are physically separated from the lithium bicarbonate using an ion selective means, such as an ion exchange material, or by liquid—liquid extraction. Purified lithium carbonate is then precipitated.

33 Claims, 2 Drawing Sheets

PROCESS FOR THE PURIFICATION OF LITHIUM CARBONATE

CROSS REFERENCE TO RELATED APPLICATION

This application claims priority under 35 U.S.C. § 119(e) to U.S. Provisional Application Ser. No. 60/069,165 filed Dec. 9, 1997, entitled "METHOD FOR PRODUCING LITHIUM CARBONATE".

FIELD OF INVENTION

The invention relates to an improved process for the purification of lithium carbonate.

BACKGROUND OF THE INVENTION

Lithium carbonate ($Li_2CO_3$) is produced commercially from three sources: (1) extraction from mineral sources such as spodumene; (2) lithium-containing brines; or (3) from sea water.

There are a number of commercial applications of lithium carbonate including: as an additive in aluminum molten salt electrolysis and in enamels and glasses. In its purer forms, (for example, having 99.1 wt % $Li_2CO_3$) $Li_2CO_3$ is used to control manic depression, in the production of electronic grade crystals of lithium niobate, tantalate and fluoride. High purity lithium carbonate is also required in the emerging technologies of lithium batteries. (There are two major classes of rechargeable lithium batteries, those using lithium ion and thin film polymer electrolyte-lithium metal.)

In the case of the lithium ion battery, purified lithium carbonate is required for the cathode. In the case of thin film batteries using polymer electrolytes, lithium metal is obtained by chlorinating lithium carbonate to form lithium chloride and subsequent electrolysis to metallic lithium. The key to obtaining lithium of the grade required for lithium batteries is to use purified lithium chloride and carrying out electrolysis in the virtual absence of air and humidity to minimize lithium's rapid reactions with these substances.

Electrolytic production of lithium metal is practiced commercially using an eutectic melt of LiCl and KCl (45 and 55 wt %, respectively) at 450° C. under anhydrous conditions. During electrolysis, lithium metal produced typically at a steel cathode rises to the surface of the melt due to its significantly lower density (0.5 g/ml relative to 1.5 g/ml for the melt). At the anode, chlorine gas is evolved. In some cell designs, there is a diaphragm between the anode and cathode to prevent or at least partially prevent recombination of chlorine and lithium. In other cell designs, as described in U.S. Pat. Nos. 4,617,098 and 4,734,055, a diaphragm is avoided by using the so-called "gas-lift" effect which reduces the contact time between the lithium metal and the chlorine gas, thus reducing their rate of recombination. It is also believed that the molten salt provides a protective covering over the surface of the lithium.

As mentioned above, the key to obtaining high purity lithium metal is to minimize impurities such as sodium, calcium and magnesium in the lithium chloride feed to the electrolyser. There are, however, other impurities such as carbonate, sulfate and borate, which, while not significantly affecting the purity of the lithium metal produced, they do affect the performance of the electrochemical cell, by increasing the consumption of the carbon anodes by the oxidation of these species at the anode, resulting in the production of carbon dioxide and by decreasing the current efficiency of the metal production. This effect is well known in molten salt electrolysis, though poorly understood. They are also known to adversely affect the current efficiency of both lithium and magnesium cells, though the mechanism is not known.

Published accounts of the commercial production of lithium chloride describe the reaction of hydrochloric acid with lithium carbonate in an aqueous solution. Impurities such as sulfate are removed by addition of barium chloride and filtration. Lithium chloride is recovered by evaporation and crystallization. In these processes, some impurities are removed by a bleed of the liquor during the evaporation and crystallization. Lithium chloride is extremely hygroscopic, leading to difficulties in the drying step with corrosion and with increased energy requirements. The major difficulties with these processes are the large energy demand, theoretically $30 \times 10^3$ kJ/kg, and the need for corrosion resistant materials and inability to use directly (i.e., without pretreatment) lithium carbonate from sources other than minerals, such as lithium carbonate from brines, since they often contain significant concentration of borates which are deleterious for the operation of the electrochemical cells.

Alternative methods have been described for the production of lithium chloride, including our copending patent application for the direct chlorination of lithium carbonate by chlorine at 300–650° C. in molten lithium chloride. There are equally numerous patents describing the recovery of lithium chloride from brines including U.S. Pat. Nos. 5,219, 550, 4,980,136 and 4,243,392 but these do not appear to have yet achieved commercial practicability.

In U.S. Pat. Nos. 4,271,131, 4,243,392, 4,261,960 and 4,274,834, Brown, et al. teach processes whereby lithium chloride is concentrated to 40% by weight and then heated to over 200° C. to render the boron insoluble as boron oxide. Isopropanol extracts lithium chloride, leaving a residue of boron oxides and other insoluble materials. Purified lithium chloride is recovered by evaporation of isopropanol and crystallization. These processes involve a calcination step which is costly, both in terms of capital and operating costs due to the materials of construction. Additionally, yields are reduced, further increasing operating costs.

In an improved version of the above process, fatty acid alcohols such as iso-octyl alcohol dissolved in kerosene are used to extract boron as boric acid from lithium brine. The boron-free aqueous brine is then evaporated at 105–115° C. under a vacuum of 70–90 mm Hg absolute pressure to give crystals of lithium chloride. The majority of the calcium and magnesium remain in solution so purer lithium chloride is recovered by filtration or by centrifugation to give 99% pure lithium chloride. Additional washing with low molecular weight alcohol gives greater than 99% purity. When combined with extraction with isopropanol, 99.9% pure LiCl is obtained, as described in U.S. Pat. No. 4,274,834.

U.S. Pat. No. 5,219,550 describes a process for producing low boron lithium carbonate. Lithium chloride-rich brine is contacted with a fatty alcohol dissolved in kerosene to extract boron. Magnesium and calcium are removed by precipitation and liquid-solid separation. The brine is then treated with sodium carbonate to precipitate lithium carbonate and sodium chloride brine. Lithium carbonate produced by this process has a purity of 99.57%. Boron content is reduced to 1 ppm from 500 ppm, with calcium levels at 80 ppm and magnesium at 20 ppm. This grade of lithium carbonate contains levels of magnesium and calcium in excess of that required for production of battery-grade lithium.

An alternative process is described by Brown, et al., in U.S. Pat. Nos. 4,036,713 and 4,207,297. These patents describe transformation of impure $Li_2CO_3$ into LiOH and precipitation of calcium carbonate by treatment with $CO_2$. The process concentrates brines, either natural or otherwise, containing lithium and other alkali and alkaline metal halides to 2–7% of lithium content. Most of the alkali and alkaline earth compounds are removed by precipitation at a pH between 10.5–11.5. The pH is modified with recycled LiOH, which removes the remaining magnesium, and by $Li_2CO_3$ and/or $CO_2$, which produces calcium carbonate as a precipitate.

The purified brine is electrolyzed in the anolyte of an electrochemical cell divided by a cation exchange membrane, the catholyte being LiOH. In the process, lithium ions migrate through the membrane to form highly pure lithium hydroxide which can be recovered as $LiOH.H_2O$ or as $Li_2CO_3$.

Brown, et al. describe the purification of technical grade $Li_2CO_3$ by first slurrying $Li_2CO_3$ in an aqueous solution and causticizing with hydrated lime ($Ca(OH)_2$). Impurities including calcium carbonate precipitate out and a lithium hydroxide solution is either fed to an evaporator to give pure solid $LiOH.H_2O$ as a solid or to a carbonation reactor to which $CO_2$ and $Li_2CO_3$ are added to preferentially precipitate calcium carbonate, which is then separated by filtration or a similar method. The purer LiOH can then be reacted with $CO_2$ to give $Li_2CO_3$. The dilute solution is returned to the causticification reactor. The concentration of $Ca^{2+}$ is still around 50–60 ppm. The $SO_4^{2-}$ concentration is approximately 100 ppm and thus the purity would not meet the specifications of lithium carbonate to be used to produce battery grade lithium metal.

As can be gleaned from the prior art described above, a significant research and development effort has been invested in the search for economic means of commercially exploiting lithium-containing brines and to produce lithium salts such as chloride and carbonate of sufficient purity to produce high-purity lithium metal.

One method of obtaining pure lithium carbonate is extraction from mineral sources such as spodumene or lithium aluminum silicate ore ($LiAlSi_2O_6$). Usually recovered from open pit mines, spodumene is exploited commercially because of its relatively high lithium content and ease of processing. After ore decrepitation, the α-spodumene concentrate (of 5–7% $Li_2O$ content) is transformed into β-spodumene by heating to over 1100° C.

This treatment facilitates extraction of the spodumene into sulfuric acid at 250° C. to give lithium sulfate. After filtration to remove solids, the solution is treated with sodium hydroxide and sodium carbonate to form sodium sulfate (Glauber salt) and precipitate lithium carbonate, recovered by filtration; lithium sulfate solution to be recycled. Glauber salt is precipitated by cooling.

An alternative to this commercial process is described by Archambault in U.S. Pat. Nos. 3,112,170 and 3,112,171, practiced by Quebec Lithium Corporation and further improved by Olivier, et al. (U.S. Pat. No. 4,124,684). In this process, β-spodumene is treated directly with a 15% excess of sodium carbonate at around 215° C. and 310 psig. The lithium is transformed into insoluble lithium carbonate. Once cooled to around 20–30° C. and the slurry is fed to a carbonation reaction treatment with carbon dioxide under pressure to form lithium bicarbonate, solubilizing the lithium content. The solution is then filtered to remove solids such as aluminum silicate and iron and magnesium salts. The liquor is then fed to a precipitation reactor under atmospheric pressure at 80–90° C., liberating carbon dioxide and precipitating lithium carbonate. The lithium carbonate is then recovered by filtration, and the liquor is recycled back to the extraction process. The purity of the material, once dried, is approximately 99%, but is insufficient for battery grade lithium metal production or for pharmaceutical grade lithium carbonate. In particular, calcium levels are too high.

The commercial production for battery grade lithium requires spodumene-derived lithium carbonate to obtain the desired lithium purity and even then requires further purification during the transformation of lithium carbonate to lithium chloride. The alternative source of lithium values are brines which produce lithium carbonate at a lower cost but at a lower purity than mineral sources. To produce lithium chloride of high purity, the carbonate is first transformed into lithium hydroxide before chlorination to give battery grade lithium chloride, a comparatively expensive process.

Prior patents involving the production of high purity lithium carbonate and lithium purification include Japanese Application #1-152226 (1989) and U.S. Pat. Nos. 3,344,049, 4,988,417 and 4,842,254.

Prior art patents which deal with bicarbonation processes include U.S. Pat. Nos. 2,390,095, 2,630,371 (both for magnesium) and 4,124,684, 3,112,170 and 3,112,171 for lithium.

SUMMARY OF THE INVENTION

The present invention addresses these and other problems in the prior art by providing, in one aspect, a process in which an impure feed of $Li_2CO_3$ is mixed with an aqueous solution and reacted with $CO_2$, preferably under pressure, to produce dissolved aqueous $LiHCO_3$. Insoluble impurities such as iron, magnesium and calcium are removed by physical means such as filtration or centrifugation. Soluble divalent or trivalent ions such as magnesium, calcium and iron are adsorbed by selective ion exchange or other similar methods. Carbon dioxide is then completely or partially removed by raising the solution temperature or otherwise and pure $Li_2CO_3$ precipitates. Preferably, at least a part of the solution is returned to the bicarbonation reaction zone to enhance the economics of the process. Undesirable impurities remain in solution. The unrecycled solution can be neutralized to give technical grade lithium carbonate (i.e., having maximum impurity levels ppm of: Na(25), Ca(20), Mg(5), Fe(0.5), K(5), $SO_4^{2-}$ (25) and B(2)).

Bicarbonation can be carried out with an excess of $CO_2$ up to about 10 times the stoichiometric requirement. Excess $CO_2$ can be separated and recycled to enhance process economics.

In another aspect of the present invention, bicarbonation can be carried out in a series of reactors. Similarly, $Li_2CO_3$ precipitation can be in a series of reactors operating at increasingly higher temperatures close to the boiling point of water.

BRIEF DESCRIPTION OF THE DRAWINGS

The present invention will be better understood with reference to the following figures in which like reference numerals refer to like elements and in which FIG. 1 schematically illustrates a flowchart of one embodiment of the present invention.

DETAILED DESCRIPTION OF PREFERRED EMBODIMENTS

The present invention relates to a process for producing lithium carbonate of sufficient purity for conversion into lithium chloride and eventually battery grade lithium metal or as feedstock for diverse lithium salts used in lithium ion batteries. Such salts include lithium carbonate, lithium nitrate, lithium hexafluorophosphate, etc. These salts are either used as part of the electrolyte or as part of the cathode oxide matrix.

Contrary to earlier belief, it has been discovered that commercially available lithium carbonate from brine sources can be purified without being transformed first into lithium hydroxide. Thus, from the lithium carbonate generated by this process, lithium chloride can be produced substantially free of contaminant metal ions such as calcium, magnesium and sodium, and thus the lithium metal produced by this process is ultra-pure having maximum impurity levels (ppm) of Na(100), Ca(190), N(300), Fe(100), K(100) and Cl(60) as is required for lithium battery production. By "substantially free", it is meant that LiCl has a maximum ion impurity content (ppm) of: Na(16), Ca(31), Fe(16), $SO_4^{-2}$(60) and B(17).

It has also been discovered that using processes according to the present invention, calcium can be removed by ion exchange without high temperature liquid—liquid extraction from molten lithium chloride using lithium alloys, as described in our co-pending patent application Ser. No. 08/832,235, filed Jun. 3, 1997, abandoned, or by transforming impure lithium carbonate into lithium hydroxide as described by Brown, et al. The high temperature liquid—liquid extraction technique, though technically feasible, is difficult since it requires rigorous exclusion of air to prevent oxidation of the Ca dissolved in the Li alloy to insoluble CaO. Though relatively simple in the laboratory, such exclusion is difficult commercially because of scale-up problems. Though blanketing with inert gases is feasible, the technique is critical to the production of lithium metal. The method is also, unfortunately, limited to the removal of Ca ions.

Figure 1:
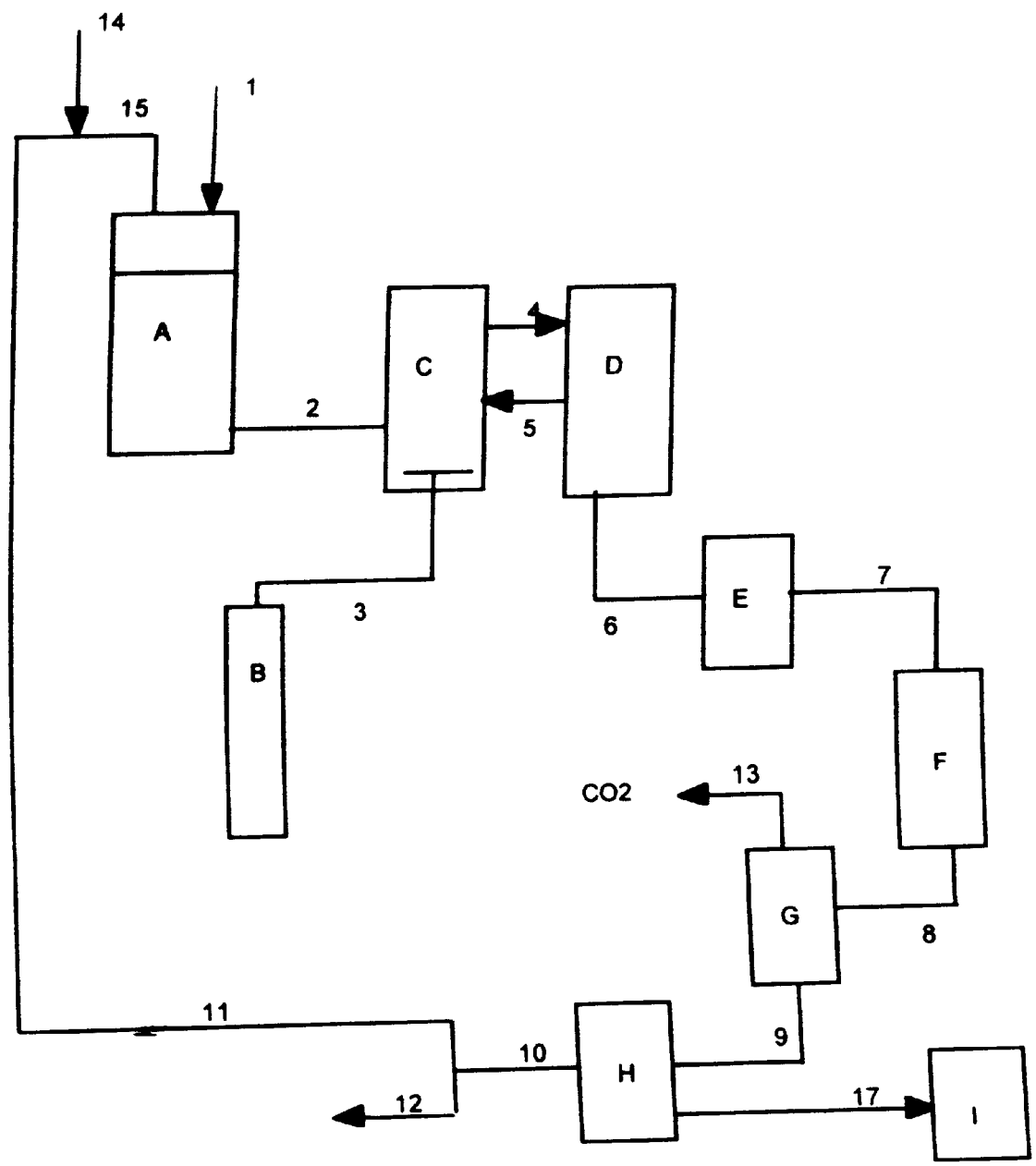
Figure 2:
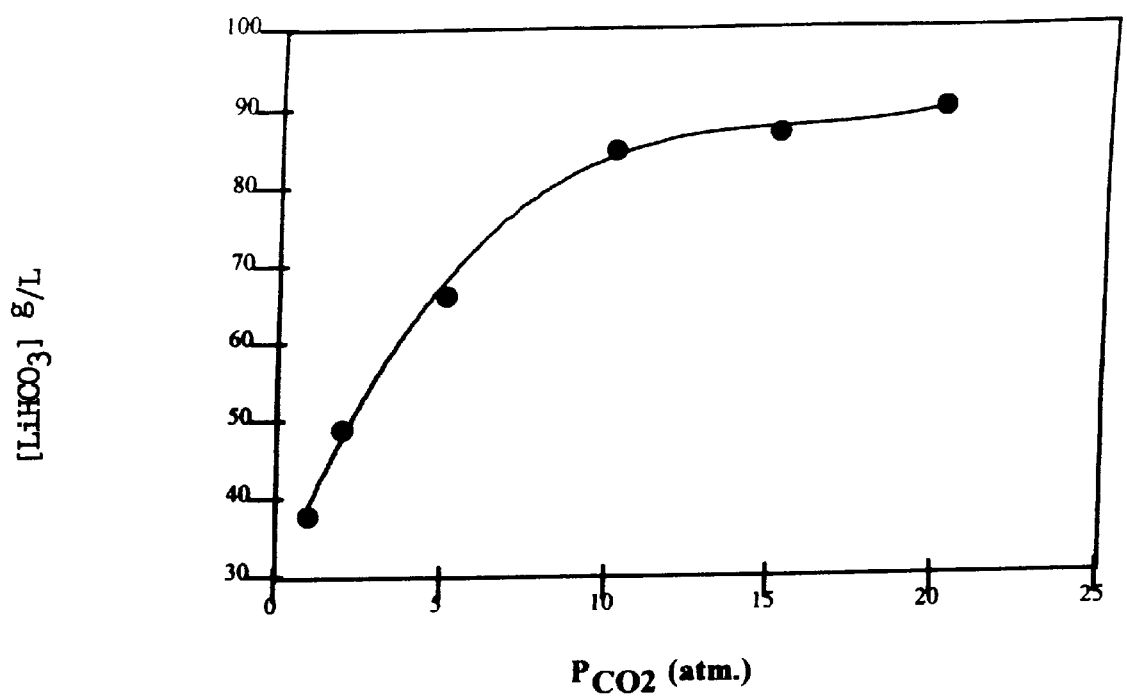
FIG. 2 is a graph of total concentration of $Li_2CO_3$ and $LiHCO_3$ solubilized as a function of $CO_2$ partial pressure.

As is shown in FIG. 1, according to one embodiment of the invention, impure lithium carbonate (1) of typical purity (though other purities may be included), as set forth in Table 1, is dispersed in aqueous solution (15), preferably using an agitated vessel (A). This mixture (2) is fed to a bicarbonation reactor (C) at ambient temperature along with a carbon dioxide stream (3). Under these conditions, dispersed lithium carbonate is transformed into lithium bicarbonate $LiHCO_3$, soluble in the aqueous solution. Impurities such as iron, calcium and magnesium remain either totally insoluble or partially insoluble after bicarbonation. The maximum solubility of $LiHCO_3$ is increased at higher partial pressure of carbon dioxide in the vessel from 40 g/l at 1 atm to 90 g/l at 10 atm (FIG. 2). An excess of carbon dioxide is preferred to assure complete dissolution of the lithium carbonate. The excess can be between 10% to about 10 times stoichiometry, but preferably in the range 1.1 to 2 times the stoichiometric requirement.

From the bicarbonation reactor, the solution is fed still under pressure, to a separating tank (D) where excess $CO_2$ is allowed to separate by simple decantation and recycled back to the bicarbonation reactor for economic reasons only. The remaining solution, preferably still under pressure, is fed through filter (E) or similar solids-retaining device to remove insoluble compounds such as Fe, Ca and Mg as well as silicate and aluminate species. The filtered solution (7) is then fed to an ion exchange or other selective method (F) to remove divalent and trivalent ions, principally calcium and magnesium. Ion exchange resins containing aminophosphonic acid groups such as PUROLITE S-940 or DUOLITE C-467 are preferred, or weak acid resins can be used, though any ion exchange resin selective to divalent ions can be used. Or indeed ion selective liquid—liquid extraction could also be employed. At the exit of the ion exchange or extraction device (F), the bicarbonate solution is heated in a vessel (G) to a temperature between about 60° C. and 95° C. and any pressure applied is released. Carbon dioxide is evacuated through line (13), either to atmosphere or where economically viable, dried and recompressed for reuse in the bicarbonation reactor. Under these conditions, the pure lithium carbonate precipitates, whereas ions such as sodium, potassium and sulfate remain soluble in the solution. The pure lithium bicarbonate solid residue is recovered by known solids separation methods, such as filtration and centrifugation (H) with the liquid stream (10) for economic reasons fed back to vessel (A) and stream (12) being bled from the system, with any dissolved lithium carbonate or bicarbonate being preferably recovered, if economic, by neutralization or other suitable method to give technical grade lithium carbonate which can be of commercial value. The filter cake from the solids recovery apparatus (H) can be washed preferably with hot water to increase purity. The washing, where economically desirable, is recycled back to the process via stream (14). The washed lithium carbonate is dried in a suitable drying apparatus (I).

The present invention can be carried out batchwise or continuously. In a preferred embodiment of the continuous process, the bicarbonation reaction occurs in a series of reactors under pressures of at least 1 atmosphere, preferably between 2–20 atmospheres and most preferably between 5–15 atmospheres. Similarly, in the continuous version of the process, precipitation can be carried out in a series of reactors operating at increasingly high temperatures close to the boiling point of water. The reactors can also be operated under vacuum to assist the liberation of carbon dioxide or equally sparged with a gas to assist the liberation of carbon dioxide gas. Likewise, where economically viable, water evaporated during lithium carbonate precipitation can be recovered by condensation or other economical methods and recycled back to the process either at stream (14) or for washing of the lithium carbonate.

To increase the rate of precipitation or to control the carbonate particle size, pure lithium carbonate recycled from the subsequent solids recovery step can be added to the first or second precipitation reactors. The added quantity is typically up to 90% of the solid recovered by filtration and preferably between 5–50%, with the most preferred range being 10–25% of the product recovered.

Resin, once saturated with $Ca^{2+}$ ions, can be regenerated. The regeneration involves first washing with water, then treatment with hydrochloric acid to displace calcium ions from the resin. The resin is then washed with water and regenerated with lithium hydroxide solution. The lithium hydroxide solution is easily recycled.

Lithium hydroxide used to regenerate the spent resin contains diluted lithium hydroxide which can be regenerated by any number of methods, for example, evaporation, perevaporation using membrane, alkaline water electrolysis, electrodialysis, dialysis etc.

Spent hydrochloric acid solution used for regeneration of the spent ion-exchange resin becomes contaminated with both lithium and calcium ions. It can be recycled and used a number of times before it needs to be replaced. This solution can be regenerated by a number of methods, including electrodialysis involving either standard membranes or divalent selective cation exchange membranes. Similarly, electrolysis could be used to regenerate the hydrochloric acid, should membranes be developed that are not sensitive to the presence of calcium ions. The regeneration process would involve the transfer of Li and Ca ions across the membrane and hydrogen and oxygen evolution at the cathode and anode respectively. By this method, hydrochloric acid would be concentrated in the anolyte chamber, while Li and Ca ions would be transferred through the membrane to produce a mixture of lithium and calcium hydroxide. Treatment of said solution with $CO_2$ by known methods would result in the precipitation of calcium as calcium carbonate.

Anion exchange membranes can be used to transfer chloride ions and generate lithium hydroxide in the cathode compartment, which can then be treated with carbon dioxide, as described above. Other methods of regeneration can be imagined, including, but not limited to, electrochemical ion-exchange, precipitation, solvent extraction of either lithium or calcium ions, or methods of absorption by zeolites or other similar materials.

The following examples are illustrative of, but do not limit, processes according to the present invention.

EXAMPLE 1

50 parts of technical grade lithium carbonate and 1300 parts of demineralized water were placed in a reactor. Carbon dioxide gas was sparged into the reactor equipped with an agitator designed to disperse the $CO_2$ bubbles. The reactor temperature was controlled at 35° C. The agitator speed was controlled at 1200 rpm throughout the reaction. The $CO_2$ was bubbled in the reactor at a flow rate of 1 liter/minute. The carbonation reaction was completed after 40 minutes of $CO_2$ bubbling and the solution was filtered. The filtrate was then transferred to a second agitated reactor and heated to 90° C. and maintained at this temperature and under agitation for 2 hours to eliminate $CO_2$. The resulting slurry was filtered and the solid was dried in an oven for 24 hours. The concentration of impurities in the lithium carbonate was determined before and after purification by flame atomic absorption spectroscopy and by inductively coupled plasma analysis. Table 1 presents the results.

TABLE 1

| Impurity | Na (ppm) | Ca (ppm) | Fe (ppm) | Mg (ppm) | K (ppm) | $SO_4^=$ (ppm) | B (ppm) |
|---|---|---|---|---|---|---|---|
| $Li_2CO_3$ before purification | 672 | 122 | 5 | 17 | 216 | 2300 | <3 |
| $Li_2CO_3$ after purification | 13 | 18–70 | <5 | 3 | 5 | 69 | <3 |

EXAMPLE 2

250 parts of demineralized water and 9.7 parts of technical grade lithium carbonate were placed in a 500 ml reactor equipped with a glass sparge and homogenizer. The mixture was heated to 34° C., and the carbonation reaction was started by bubbling $CO_2$ gas at 1 liter/minute. After 75 minutes of reaction, the solution was filtered and passed through a resin column containing 100 parts by volume of PUROLITE S-940 ion exchange resin at a flow rate of 500 parts/hour. The bicarbonate solution was then transferred to a 500 ml reactor and heated to 94° C. and kept at this temperature and under agitation for 1 hour. The precipitated lithium carbonate was filtered as described in example 1. Table 2 lists the concentrations of Na and Ca in the lithium carbonate before and after purification.

TABLE 2

| Impurity | Na (ppm) | Ca (ppm) |
|---|---|---|
| $Li_2CO_3$ before purification | 540 | 147 |
| $Li_2CO_3$ after purification | 16 | 20 |

EXAMPLE 3

86 parts of technical grade lithium carbonate were added to 800 parts of demineralized water in a 1 L stainless steel autoclave. The reactor was sealed and purged with $CO_2$, the agitation was set at 550 rpm and $CO_2$ was introduced in the reactor at constant pressure. The reaction mixture temperature and the $CO_2$ flow rate were monitored. The concentrations of lithium carbonate and lithium bicarbonate were determined as a function of time. As shown in FIG. 2, the concentration of lithium carbonate and lithium bicarbonate expressed as total amount of lithium carbonate solubilized after 75 minutes of reaction at 25° C. are shown in FIG. 2. As it may be seen, the solubility of lithium carbonate increases as the $CO_2$ pressure is raised.

EXAMPLE 4

62.6 parts of technical grade lithium carbonate was solubilized under the conditions mentioned in example 3. The resulting solution was filtered and passed through 100 parts by volume of PUROLITE S-940 resin at a flow rate of 600 parts/hour. The lithium carbonate was then precipitated as described in example 1 and washed with 200 parts of demineralized water. Table 3 lists the concentration of the analyzed impurities.

TABLE 3

| Impurity | Na (ppm) | Ca (ppm) | Fe (ppm) | K (ppm) | Mg (ppm) |
|---|---|---|---|---|---|
| $Li_2CO_3$ before purification | 540 | 130 | 5 | 10 | 40 |
| $Li_2CO_3$ after purification | <0.2 | 13 | <0.4 | <0.3 | <0.4 |

EXAMPLE 5

Purification of 57.8 parts of technical grade lithium carbonate was carried out at 25° C. using the same experimental set up described in example 1. 0.8 and 1.6 g sodium carbonate were added to the reaction mixture. The Na concentration in $Li_2CO_3$ before purification was assumed to be 1200 ppm. A small sample of the precipitated $Li_2CO_3$ was taken and the rest was washed with 200 ml demineralized water. Table 4 presents the results in terms of sodium concentration in the purified $Li_2CO_3$.

TABLE 4

| Simulated number of recycles | Na concentration (ppm) in purified $Li_2CO_3$ | |
|---|---|---|
| | Filtered | Washed |
| 5 | 114 | 14 |
| 10 | 132 | 28 |

EXAMPLE 6

The 800 parts of the solution remaining after the precipitation of $Li_2CO_3$ (containing some lithium carbonate and bicarbonate) with a total Li content of 2.2 wt % in example 4 was reused in the purification of additional batches of 62.6 parts of technical grade $Li_2CO_3$. Table 5 lists the concentration of impurities in the purified lithium carbonate obtained after 4 recycles.

TABLE 5

| Impurity | Na (ppm) | Ca (ppm) | Mg (ppm) | K (ppm) | $SO_4=$ (ppm) | B (ppm) |
|---|---|---|---|---|---|---|
| $Li_2CO_3$ before purification | 540 | 130 | 39.5 | 10 | 350 | <3 |
| Washed $Li_2CO_3$ after purification | 22 | 11.4 | 2.7 | 6.2 | <20 | <3 |

EXAMPLE 7

Carbonation was performed at 25° C. and at 150 psi as described in example 4. 800 parts by volume of solution containing 78 g/l solubilized $Li_2CO_3$ were transferred to a second reactor and heated to 85° C. with agitation and under atmospheric pressure for 2 hours. At the end of the experiment, 42.3 g $Li_2CO_3$ was recovered by filtration and 3390 ppm Li remained in the solution.

EXAMPLE 8

The procedure was repeated as described in Example 7 except that the precipitation was assisted by bubbling air through the liquid at a rate of 1 part/minute. At the end of the experiment, 48.4 g $Li_2CO_3$, were recovered and 1940 ppm Li remained in the solution.

EXAMPLE 9

The procedure according to example 7 was repeated except that the bicarbonate solution was heated at 70° C. for 45 minutes but with a reduced pressure to 20–35 mm Hg. At the end of the experiment, 47 g $Li_2CO_3$ were recovered with 2510 ppm of Li remaining in solution.

EXAMPLE 10

Example 7 was once more repeated except that the precipitation was performed at 96° C. and an additional 10 parts of purified $Li_2CO_3$ per 50 parts of precipitated $Li_2CO_3$ were added to the solution at the beginning of the precipitation step. 58 parts of $Li_2CO_3$ were recovered and the mean particle size was 75 microns. The residual Li concentration in the liquor was 1600 ppm.

EXAMPLE 11

Example 10 was repeated, though the temperature was lowered to 77° C. at the precipitation step and air was bubbled through the solution at a rate of 1 l/min. 48.2 parts of $Li_2CO_3$ were recovered at 75 microns mean particle size. The residual concentration of Li ions in the solution was 1420 ppm.

EXAMPLE 12

62 parts of technical grade lithium carbonate, 62 parts of ACS grade calcium hydroxide and 1000 parts of water were placed in a reactor and the mixture was agitated and heated to 80° C. The slurry was filtered after 60 minutes. The resulting solution contained 37 g/l LiOH and 26 ppm $Ca^{2+}$. The solution was then treated with 100 parts of PUROLITE S-940 resin at a rate of 10 parts per minute and at a temperature of 70° C. The concentration of $Ca^{2+}$ in the solution was significantly reduced (more than 99% $Ca^{2+}$ removal) after the treatment with the resin. The lithium hydroxide solution was then placed in a carbonation reactor at 90° C. and $CO_2$ was bubbled in the agitated solution at a rate of 100 ml/min for 40 minutes. The precipitated $Li_2CO_3$ was filtered and dried. The composition of the lithium carbonate before and after purification is presented in Table 6.

TABLE 6

| | $[Ca^{2+}]$ (ppm) | $[Mg^{2+}]$ (ppm) |
|---|---|---|
| $Li_2CO_3$ before treatment | 130 | 39 |
| Initial LiOH solution | 26 | N/A* |
| LiOH solution, 1st resin treatment | 0.35 | N/A* |
| LiOH solution, 2nd resin treatment | 0.05 | N/A* |
| Purified $Li_2CO_3$ | 4.2 | <0.04 |

*N/A: Not analyzed

We claim:

1. A method of producing high purity lithium carbonate, comprising the steps of:

reacting impure $Li_2CO_3$ in a first aqueous solution with $CO_2$ to form a second aqueous solution containing dissolved $LiHCO_3$, dissolved compounds and insoluble compounds, wherein said dissolved compounds and said insoluble compounds include impurities from said impure $Li_2CO_3$;

separating unreacted $CO_2$ and said insoluble compounds from said second aqueous solution;

separating said dissolved impurities from said second aqueous solution by contacting with an ion selective medium to remove said dissolved impurities including divalent and trivalent ions; and precipitating $Li_2CO_3$ from said second aqueous solution.

2. A method according to claim 1, wherein said reacting step is carried out at a partial pressure of $CO_2$ between about 1 atm and 10 atm.

3. A method according to claim 1, wherein said reacting step is carried out with an amount of $CO_2$ in excess of the stoichiometric amount of $CO_2$ with respect to $LiHCO_3$.

4. A method according to claim 3, wherein said excess $CO_2$ is between about 0.1 and 10 times the stoichiometric amount of $CO_2$.

5. A method according to claim 4, wherein said excess $CO_2$ is between about 1.1 and 2 times the stoichiometric amount of $CO_2$.

6. A method according to claim 1, wherein said ion selective medium comprises an ion exchange resin.

7. A method according to claim 1, wherein said ion selective medium comprises a liquid that selectively extracts said ions from said second aqueous solution.

8. A method according to claim 1, wherein said precipitation step is carried out at a temperature of between about 60° and 100° C.

9. A method according to claim 1, wherein said impurities include compounds of Ca, Mg and Fe.

10. A method according to claim 9, wherein $Li_2CO_3$ precipitated from said second aqueous solution has a purity of at least 91.1 wt %.

11. A method according to claim 1, wherein said steps are carried out continuously at a pressure of at least about 1 atm.

12. A method according to claim 11, wherein said pressure is between about 2 atm and 20 atm.

13. A method according to claim 12, wherein said pressure is between about 5 atm and 15 atm.

14. A process according to claim 1 in which the ion selective medium is an ion exchange resin.

15. A process according to claim 1 in which the resin is an aminophosphonic acid resin.

16. A process according to claim 1 wherein the lithium carbonate precipitated from said second aqueous solution is substantially free of the impurities including metal ions from said impure $Li_2CO_3$.

17. A method, comprising the steps of:
   a) contacting an aqueous brine containing impure $Li_2CO_3$ with $CO_2$ at ambient temperature and under pressure to form a re of dissolved $LiHCO_3$ dissolved ions in aqueous solution and insoluble compounds;
   b) separating said insoluble compounds from said mixture to form a first solution containing said dissolved $LiHO_3$ and dissolved ions;
   c) extracting at least some of said dissolved ions including divalent and trivalent ions from said first solution with an ion selective medium to form a second solution containing said dissolved $LiHCO_3$;
   d) maintaining said pressure while carrying out said separating and extracting steps; and
   e) heating said second solution to form solid $Li_2CO_3$, gaseous $CO_2$ and dissolved impurities.

18. A method according to claim 17, wherein said contacting step is carried out at a partial pressure of $CO_2$ between about 1 atm and 10 atm.

19. A method according to claim 17, wherein said contacting step is carried out with an amount of $CO_2$ in excess of the stoichiometric amount of $CO_2$ with respect to $LiHCO_3$.

20. A method according to claim 19, wherein said excess $CO_2$ is between about 0.1 and 10 times the stoichiometric amount of $CO_2$.

21. A method according to claim 19, wherein said excess $CO_2$ is between about 1.1 and 2 times the stoichiometric amount of $CO_2$.

22. A method according to claim 17, wherein said ion selective medium comprises an ion exchange resin.

23. A method according to claim 17, wherein said ion selective medium comprises a liquid that selectively extracts said ions.

24. A method according to claim 17, wherein said heating step is carried out at a temperature of between about 60° C. and 100° C.

25. A method according to claim 17, wherein said dissolved ions include Ca, Mg and Fe.

26. A method according to claim 25, wherein said solid $Li_2CO_3$ has a purity of at least 91.1 wt %.

27. A method according to claim 17, wherein said steps are carried out continuously and said pressure is at least about 1 atm.

28. A method according to claim 27, wherein said pressure is between about 2 atm and 20 atm.

29. A method according to claim 27, wherein said pressure is between about 5 atm and 15 atm.

30. A process according to claim 17 in which the ion selective medium is an ion exchange resin.

31. A process according to claim 17 in which the ion exchange resin is an aminophosphonic acid resin.

32. A method according to claim 17 further comprising separating the solid $Li_2CO_3$ from the products of step (e).

33. A method according to claim 32 wherein the solid $Li_2CO_3$ recovered from step (e) is substantially free of impurities including metal ions from said impure $Li_2CO_3$.

* * * * *